United States Patent [19]

Russell

[11] Patent Number: 5,303,481
[45] Date of Patent: Apr. 19, 1994

[54] GAS METER RISER ALIGNMENT DEVICE

[76] Inventor: Jim L. Russell, 5018 S. Irvington Ave., Tulsa, Okla. 74135

[21] Appl. No.: 982,017

[22] Filed: Nov. 24, 1992

Related U.S. Application Data

[63] Continuation of Ser. No. 642,042, Jan. 16, 1991, abandoned.

[51] Int. Cl.⁵ .................................................. G01B 3/30
[52] U.S. Cl. ........................................ 33/529; 33/533; 29/272
[58] Field of Search ............ 33/529, 783, 810, 501.45, 33/501.06, 567, 562, 533, 555.1, 645, 370, 371; 29/272

[56] References Cited

U.S. PATENT DOCUMENTS

D. 317,573  6/1991  Step ...................................... D10/64
3,352,147  11/1967  Ligon ..................................... 29/272

FOREIGN PATENT DOCUMENTS 573748  6/1931  Fed. Rep. of Germany ........ 33/370
0212796  8/1984  Fed. Rep. of Germany ........ 33/529

Primary Examiner—William A. Cuchlinski, Jr.
Assistant Examiner—C. W. Fulton
Attorney, Agent, or Firm—Catalano, Zingerman & McKay

[57] ABSTRACT

An alignment device in which two plugs are rigidly fixed to the opposite ends of a spacing bar at a distance substantially equal to the distance between the inlet and outlet ports of the gas meter to be connected to the system is formed from a rust-free material such as nylon, preferably with an I-bar configuration and reinforced with fiberglass cords for strength. The riser is installed with one plug of the device mounted on the supplier riser so that, when the consumer riser is installed, it can be properly aligned with and connected to the other plug to later conform to the meter. Alternatively, the device could be installed between the risers by the consumer riser installer.

14 Claims, 1 Drawing Sheet

GAS METER RISER ALIGNMENT DEVICE

This is a continuation of copending application(s) Ser. No. 07/642,042 filed on Jan. 16, 1991 now abandoned.

BACKGROUND OF THE INVENTION

This invention relates generally to gas distribution systems and more particularly concerns the interconnection of consumer and supplier gas service risers at gas meter junctions.

In the connection of residential and commercial gas distribution systems, the gas company typically provides an above ground service connection including a shut off valve and a riser end plug, which remain intact until the gas meter is installed. The customer provides a consumer service connection which also includes a riser end plug. Sometime after both risers are installed, the gas company connects its meter between the gas service connection and the consumer service connection.

Since the tasks of supplier installation, consumer installation and meter installation are performed by different people at different times, frequently with extended intervals in between, problems recur with respect to such systems. First of all, the riser end plugs used to seal supplier and consumer connections are typically steel plugs which tend to rust, corrode and seize to the pipe installation, eventually requiring the breaking and replacement of pipe bends and meter swivels in order to connect the meter. A second problem occurs when the supplier connection and the consumer connection are improperly spaced, resulting in additional fittings and labor by the gas company in installing the meter as well as an unsightly looking meter connection. Third, even when the connections are properly spaced at their initial installation, temperature changes, ground shifts, icing and thawing and other factors cause the connections to shift in the absence of a connecting meter, resulting in misalignment of the connections. This not only occurs prior to initial installation of the meter, but also occurs if, for various reasons, an installed meter may have been removed for a substantial period of time.

It is, therefore, a primary object of the present invention to provide an alignment device that assures proper spacing of supplier and consumer connections prior to connection to a gas meter. It is also among the objects of the present invention to provide an alignment device that is lightweight, rust-free, reusable, easy to install, inexpensive, strong and conforming to code requirements for such installations.

SUMMARY OF THE INVENTION

In accordance with the invention, a device for aligning the supplier and consumer risers of a gas meter connection is provided in which two plugs are rigidly fixed to the opposite ends of a spacing bar at a distance substantially equal to the distance between the inlet and outlet ports of the gas meter to be connected. The device is formed from a rust-free material such as nylon, preferably of I-bar configuration and reinforced with fiberglass cords for strength. The supplier riser is installed with one plug of the aligning device mounted on the supplier riser so that, when the consumer riser is installed, it can be properly aligned with and connected to the other plug to later conform to the meter. The aligning device could be also installed between the service risers by the consumer service riser installer.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
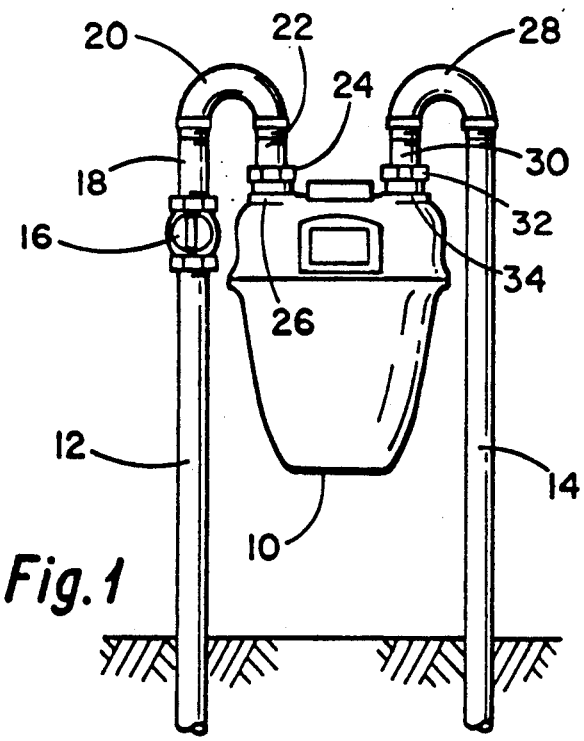
FIG. 1 is a front elevational view illustrating the completed connection of the consumer and supplier gas service risers with a gas meter.

Turning first to FIG. 1, the typical completed installation of a gas meter 10 between a supplier gas service riser 12 and a consumer gas service riser 14 is illustrated. The supply riser 12 connects through a shut-off valve 16, a first swivel section 18, a U-bend 20, a second swivel section 22 and an inlet meter swivel 24 to the gas meter inlet 26. Similarly, the consumer gas service riser 14 connects through a U-bend 28, a swivel section 30 and an outlet meter swivel 32 to the gas meter outlet 34. As is readily apparent from the drawing, proper connection of the risers 12 and 14 to the meter 10 requires proper alignment of the risers 12 and 14 and proper spacing between the meter swivel 24 and 32.

Figure 2:
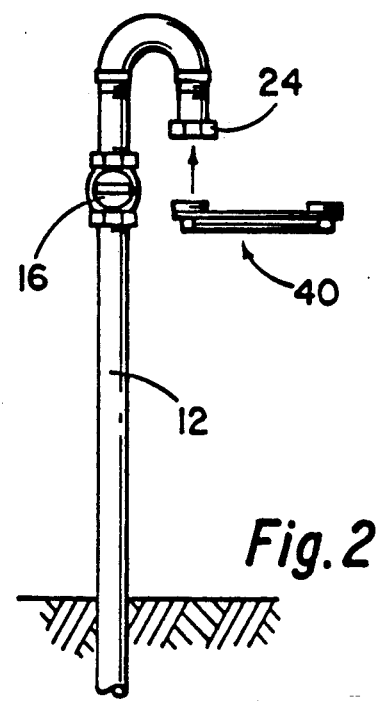
FIG. 2 is a front elevational view illustrating the supplier gas service riser of FIG. 1 and a preferred embodiment of the present alignment device.

Turning to FIG. 2, when the consumer riser 14 is to be installed, all the installer generally sees is the supplier connection extending from the riser 12 through the inlet meter swivel 24. The exact location of the consumer riser 14 is therefore left to the judgment of the installer. After installation and prior to connection of the meter, both risers are subject to ground shifts as hereinbefore discussed. To eliminate this problem, a riser alignment device 40 which may be attached to the inlet meter swivel 24 by the suppler or consumer riser installer prior to installation of the consumer riser 14.

Figure 3:
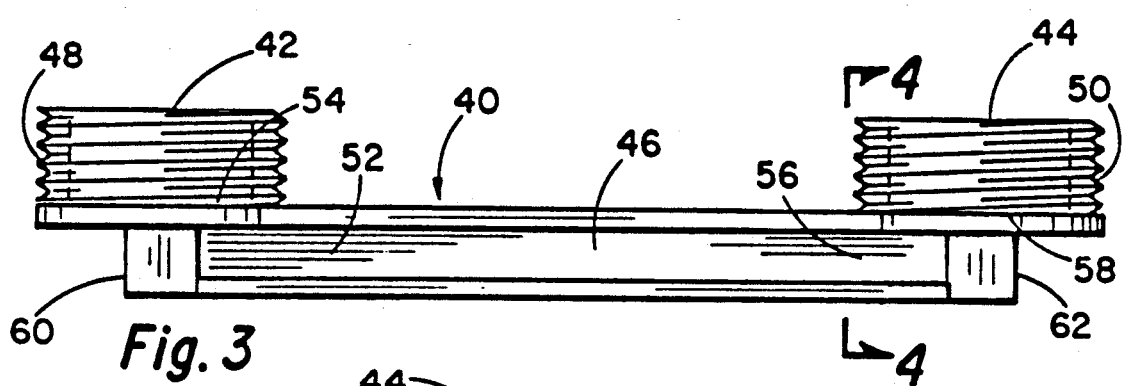
FIG. 3 illustrates a front elevational view of the alignment device of FIG. 2.
Figure 4:
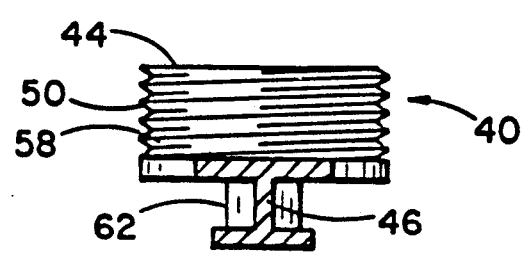
FIG. 4 is a cross-sectional view taken along the line 4—4 of FIG. 3.
Figure 5:
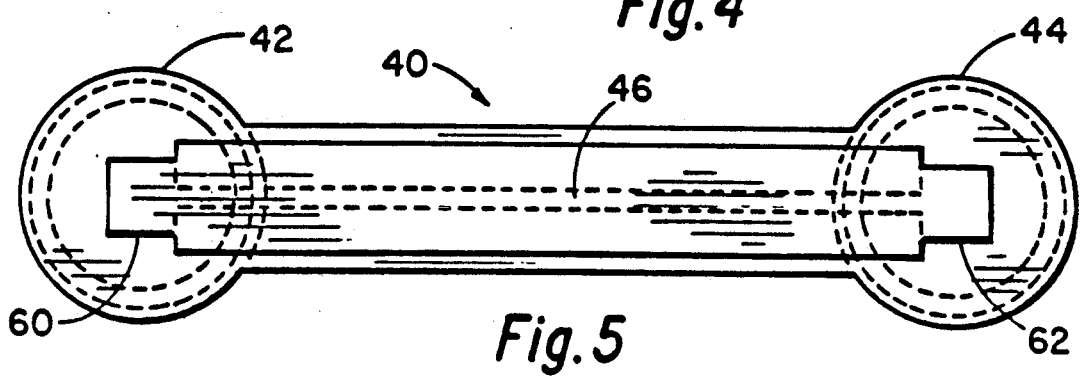
FIG. 5 is a top plan view of the alignment device of FIG. 2.

The alignment device 40 is more clearly illustrated in FIGS. 3, 4 and 5. The device 40 consists of a supply riser cylindrical plug 42 and a consumer riser cylindrical plug 44 rigidly spaced apart by a bar 46. Preferably, the bar will be of I-shaped cross-section, as can best be seen in FIG. 4, to strengthen and minimize the effect of torque on the device 40. Each of the plugs 42 and 44 has external threads 48 and 50, respectively, which complement the threads on the interior of the inlet and outlet meter swivels 24 and 32, respectively. As shown, one end 52 of the bar 46 is fixed to a base end 54 of the plug 42 and the other end 56 of the bar 46 is fixed to a base end 58 of the plug 44. Preferably, each of the plugs 42 and 44 has a head 60 and 62, respectively, extending oppositely from the base end 54 and 58 in relation to the upright cylindrical portions 42 and 44. The heads 60 and 62 are also fixed to the ends of the bar 46 and are provided with flats adapted for cooperation with standard mounting tools.

The distance between the plugs 42 and 44 will be substantially equal to the distance between the gas meter inlet and outlet ports 26 and 34. Preferably, the device 40 will be integrally formed of a non-corrosive material such nylon reinforced with fiberglass cord. A typical device 40 would space the plugs 42 and 44 on six inch centers and the threaded portions of the plugs 48 and 50 would be approximately ⅝ inches in length. These dimensions, of course, vary depending upon the dimensions of the meter to be installed and the size of the meter swivels associated therewith.

In operation, returning to FIG. 2, given the installed supplier connections extending from the riser 12 to the meter swivels 24, the device 40 is mounted on the inlet meter swivels 24 by threading the swivel 24 onto the thread portion 48 of the riser plug 42. This can be done by either the supply riser installer at the time of installation of the riser 12 or by the consumer riser installer at the time of installation of the consumer riser 14. With the device 40 fixed in place on the inlet meter swivel 24, the consumer riser installer need only align the riser 14 with the riser 12 for connection of the other riser plug 44 with the outlet meter swivel 32 shown in FIG. 1. Thus, appropriate spacing for installation of the meter 10 at a future date is assured. Furthermore, the device 40 assures that shifts in the ground surrounding the risers 12 and 14 prior to installation of the meter will not cause a misalignment of properly aligned risers 12 and 14.

In the event of disconnection of an existing meter, it will be seen that an alignment device 40 can readily be installed in place of the meter 10 to insure that the risers 12 and 14 will not become misaligned in the interval prior to reconnection of the meter 10.

It will be noted that the device 40 has no moving parts, is lightweight, will not rust to seize to the meter swivel 24 and 32, is easily carried by an installer and is readily reusable.

Thus, it is apparent that there has been provided, in accordance with the invention, a riser alignment device that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use in establishing or maintaining proper spacing between the meter swivels of consumer and supplier gas service risers to be connected to the inlet and outlet ports of a gas meter, a riser alignment device comprising:

first threaded nylon plug for connection with the meter swivel of and for stopping flow of gas through the supplier gas service riser;

second threaded nylon plug for connection with the meter swivel of and for stopping flow of gas through the consumer gas service riser;

means disposed between said first and second plugs for unchangeably rigidly spacing said first and second plugs at a distance substantially equal to the distance between the gas meter inlet and outlet ports; and said first and second nylon plugs being fiberglass reinforced.

2. A device according to claim 1, said spacing means comprising a fiberglass reinforced nylon bar of I-shaped cross-section.

3. For use in establishing or maintaining proper spacing between the meter swivels of consumer and supplier gas service risers to be connected to the inlet and outlet ports of a gas meter, a riser alignment device comprising:

first threaded nylon plug for connection with the meter swivel of and for stopping flow of gas through the supplier gas service riser;

second threaded nylon plug for connection with the meter swivel of and for stopping flow of gas through the consumer gas service riser;

means disposed between said first and second plugs for unchangeably rigidly spacing said first and second plugs at a distance substantially equal to the distance between the gas meter inlet and outlet ports; and said spacing means being fiberglass reinforced.

4. For use in establishing or maintaining proper spacing between the meter swivels of consumer and supplier gas service risers to be connected to the inlet and outlet ports of a gas meter, a riser alignment device comprising:

a first cylindrical nylon plug externally threaded to compliment the meter swivel of and to stop flow of gas through the supplier gas service riser;

a second cylindrical nylon plug externally threaded to compliment the meter swivel of and to stop flow of gas through the consumer gas service riser;

a rigid nylon bar having end portions fixed to an end wall of each of said plugs for spacing said plugs at a distance substantially equal to the distance between the gas meter inlet and outlet ports; and said first and second nylon plugs being fiberglass reinforced.

5. A device according to claim 4, said nylon bar being of I-shaped cross-section.

6. A device according to claim 5, said bar being fiberglass reinforced.

7. A device according to claim 6, said nylon bar and said nylon plugs being integrally connected.

8. For use in establishing or maintaining proper spacing between the meter swivels of consumer and supplier gas service risers to be connected to the inlet and outlet ports of a gas meter, a riser alignment device comprising:

a first fiberglass reinforced nylon plug having a base end and an upright cylindrical portion externally threaded to compliment the meter swivel of and prevent flow of gas through the supplier gas service riser;

a second fiberglass reinforced nylon plug having a base end and an upright cylindrical portion externally threaded to compliment the meter swivel and prevent flow of gas through the consumer gas service riser; and a rigid fiberglass reinforced nylon I-bar having end portions fixed to said base ends of each of said plugs for spacing said plugs at a distance substantially equal to the distance between the gas meter inlet and outlet ports.

9. A device according to claim 8, said plugs and said I-bar being integrally formed.

10. A device according to claim 8, each of said plugs having a head extending from said base end thereof oppositely from said cylindrical portion integrally connected to its respective I-bar end portion.

11. A device according to claim 10, each of said heads having flats thereon adapted for cooperation with standard mounting tools.

12. A device according to claim 8, said cylindrical portions being approximately ⅝" in length.

13. A device according to claim 8, said plugs being spaced at 6" from center to center.

14. For use in establishing or maintaining proper spacing between consumer and supplier gas service risers to be connected to the inlet and outlet ports of a gas meter, the combination comprising:
- a supplier gas service riser meter swivel;
- a consumer gas service riser meter swivel;
- a first fiberglass reinforced nylon threaded plug for connection with said meter swivel of the supplier gas service riser;
- a second fiberglass reinforced nylon threaded plug for connection with the meter swivel of the consumer gas service riser; and
- a fiberglass reinforced nylon bar disposed between said first and second plug for rigidly spacing said first and second plug at a distance substantially equal to the distance between the gas meter inlet and outlet ports.

* * * * *